United States Patent Office 3,338,870
Patented Aug. 29, 1967

3,338,870
PREPARATION OF SILARYLENESILANOL AND POLYSILARYLENESILOXANOLS
Siegfried Nitzsche and Paul Buchheit, Burghausen, Upper Bavaria, Germany, assignors to Wacker-Chemie G.m.b.H., Munich, Germany
No Drawing. Filed Mar. 7, 1966, Ser. No. 532,094
Claims priority, application Germany, Mar. 8, 1965, W 38,708
6 Claims. (Cl. 260—46.5)

This invention relates to a novel method for preparing silarylenesilanols and polysilarylenesiloxanols and to the compounds so prepared.

Silarylenesilanols and polysilarylenesiloxanols have substantial commercial promise in high temperature uses as resins, waxes and coatings. They have further potential as modifying agents for use with organic polymers and in organosiloxane polymers. Thus, a relatively inexpensive method for preparing such materials has been the object of intense research effort.

Silarylenesilanols have been prepared by hydrolysis of silarylenesilanes having hydrolyzable groups, e.g.,

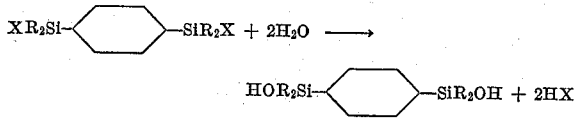

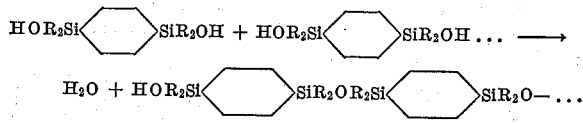

The polysilarylenesiloxanols can be prepared from the hydrolyzates so produced in accordance with the usual condensation scheme, The difficulty with this known system for preparing the desired hydroxylated silphenylenes lies in the difficulty encountered in preparation of the silylarylenesilanes having hydrolyzable groups. The silarylenesilanes having hydrolyzable groups are obtained in undesirably low yields by difficult and time-consuming methods. Accordingly, it is an object of this invention to introduce a method for preparing silarylenesilanols and/or polysilarylenesiloxanols by simpler and more efficient methods than were heretofore known.

The preparation of polysilarylenesiloxanes in high yield (i.e. above 90% of theory) and at commercially practical cost has been discovered and is the subject of copending application Ser. No. 532,077, filed concurrently herewith, entitled, "Method of Preparing Polysilarylenesiloxanes," the subject matter of said application being incorporated herein by reference. The polysilarylenesiloxanes prepared in accordance with said application do not, however, contain hydroxyl groups or the hydroxyl content of said polysilarylenesiloxanes is too low (i.e. the ratio of HO groups/molecular weight of the polymer is too low) for practical use. Thus, it is a further object of this invention to introduce a method whereby polysilarylenesiloxanes containing no hydroxyl groups or containing an undesirable and impractical low ratio of OH groups can be converted into silarylenesilanols or polysilarylenesiloxanols having an acceptably high ratio of OH groups/molecular weight.

The problems outlined above as well as others known to those skilled in the art are solved and the objects set forth above as well as others detailed in this application or apparent therefrom are achieved in accordance with this invention.

This invention relates to the preparation of silarylenesilanols and polysilarylenesiloxanols by (1) reacting polysilarylenesiloxanes with at least one mol of alkali hydroxide per mol of polysilarylenesiloxane to produce alkali metal silarylenesilanolates and/or alkali metal polysilarylenesiloxanolates, (2) reacting the product from (1) with an acid having a dissociation constant of at least $4 \times 10^{-7}$ measured in a one-tenth normal aqueous solution at 25° C. to produce the desired silarylenesilanols and/or polysilarylenesiloxanols. The reactions employed herein cleaves open siloxane bonds in the starting polysilarylenesiloxanes thereby reducing the average molecular size of the polymer and introducing OH groups on the terminal silicon atoms exposed by the siloxane bond cleavage.

The polysilarylenesiloxanes employed herein are preferably polymers of blocks of the general formula

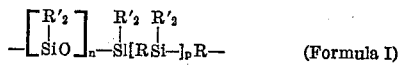 (Formula I)

wherein each R is a divalent arylene radical wherein the open valence bonds are in para position to each other, each R' is a monovalent hydrocarbon radical or a monovalent substituted hydrocarbon radical wherein the substituent group is inert to alkali metal compounds under the reaction conditions employed herein, $n$ is an integer of 1 or more and $p$ is 0 or an integer.

The silicon valences of the preferred polysilarylenesiloxane starting materials employed herein which are not satisfied by the oxygen atoms of siloxane linkages or by organic radicals are preferably satisfied by hydroxyl groups (e.g. as in a terminal siloxane group of the formula HOR'$_2$SiO—). Similarly, the valences of the arylene radicals represented by R which are not satisfied by the sequence portion of the formula

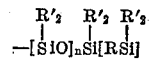

are preferably satisfied by chlorine or bromide atoms or by a group of the general formula

Preferably, all the silicon valences are satisfied by the oxygen of siloxane bonds, R radicals and R' radicals and the valences of the arylene groups are satisfied by the sequence portion of the molecule as set forth above. However, it is to be recognized that this invention contemplates employing polysilarylenesiloxane materials wherein up to 50 percent of the siloxane units present are of the general unit formula R'$_x$SiO$_{4-x/2}$ where $x$ is 0, 1 or 3 (i.e. up to 50 percent of the R'$_2$SiO units can be replaced by SiO$_2$, R'SiO$_{1.5}$ and/or R'$_3$SiO$_{0.5}$ units). Preferably, at least 98 percent of the siloxane units present are diorganosiloxane units as represented by the general unit formula R'$_2$SiO.

The R and R' radicals in the individual molecules can be alike or different. The paraphenylene radical is preferred as the R arylene radical. Other, although less preferred examples of R arylene radicals are those of the general formula

wherein R" is a monovalent hydrocarbon- or hydrocarbonoxy-radical. Examples of operable arylene groups include methylphenylene-, ethylphenylene-, n-propylphenylene-, isopropylphenylene-, n-butylphenylene, sec.-butylphenylene- and tert.-butylphenylene-radical; methoxyphenylene-, ethoxyphenylene-, n-propoxyphenylene-, isopropoxyphenylene-, n-butoxyphenylene-, sec-butoxyphenylene- and tert.-butoxyphenylene-radicals; 4,4'-biphenylene-, 4,4'-diphenylether, 4,4'-diphenylenemethane and 4,4'-diphenylene-propane-(2,2)-radicals.

The radicals represented by R' are bonded to silicon through Si—C bonding and include monovalent hydrocarbon radicals such as alkyl radicals (e.g. —$C_yH_{2y+1}$ where y is 1–18); aryl radicals (e.g. phenyl, diphenyl, anthracyl and naphthyl radicals); alkaryl radicals (e.g. tolyl, xylyl, ethylphenyl and methylnaphthyl radicals); alkaryl radicals (e.g. benzyl and phenylethyl radicals); cycloaliphatic radicals (e.g. cyclopropyl, cyclohexyl, cyclobutyl, cyclohexenyl, cyclopentyl and cyclopentenyl radicals); and alkenyl radicals (e.g. vinyl, allyl, and butenyl radicals and —$C_yH_{2y-1}$ where y is 1–18). Also operative are substituted derivatives of the foregoing hydrocarbon radicals wherein the substituent groups are inert to the alkali metal hydroxides employed herein under the reaction conditions employed. The preferred R' radicals are methyl, vinyl and phenyl and the most preferred is methyl.

There is no decisive upper limit for the molecule size of the polysilarylenesiloxanes to be incorporated according to the present discovery, nor for the values of n and p. The preferred total number of the siloxane and silarylene units is at least 10 per molecule. Preferably n is 1 to 500, particularly 1, and p is 0 to 200, particularly 0 to 30. The most worthwhile results were obtained when n is 1 and p is 0. Silarylenesilanols and/or polysilarylenesiloxanols of of the general formula H[OSiR'$_2$RSiR'$_2$]$_z$OH    (Formula II)

are then obtained, wherein z is a whole number with a value of at least 1. It is known from United States Patent No. 3,202,634, issued Aug. 24, 1965, that the compounds of Formula II can be condensed with ordinary diorganopolysiloxanes, for instance, cyclic or linear dimethylpolysiloxanes. The resulting copolymer can be processed into very valuable organopolysiloxanes.

The polysilarylenesiloxanes, composed of recurring sequences of the general formula —SiR'$_2$OSiR'$_2$R— wherein with reference to Formula I n is 1 and p is 0, are preferably those which are prepared by reacting disiloxanes of the general formula ClR'$_2$SiOSiR'$_2$Cl with arylene halides of the general formula XRX, wherein each X represents a halogen atom, attached to the phenylene radical in para position, e.g.,

with magnesium and hydrolyzing the products thus obtained, if desired.

The preferred halogen atoms X in the arylene halides employed are chlorine and bromine, especially bromine. In the preparation of the preferred polysilarylenesiloxanes employed as starting materials in the present invention, the preferred arylene halide which is used is p-dibromobenzene, in view of the above definition of the R radical. If desired, mixtures of various arylene halides can be used. Preferably 1 to 1.5 mols of arylene halides are used per mol of disiloxane.

The magnesium is incorporated in the form of the metal, expediently in forms with large surfaces, i.e., in the form of chips, kernels or powder. Preferably 2 to 2.5 mols of magnesium are applied per mol of disiloxane. Magnesium can be used in quantities exceeding this range but they offer no advantage.

A trace of iodine or an organohalide, especially a minor proportion, e.g. up to 10 mol percent, of the arylene halide, can be used to activate the magnesium in the known manner, before the other reaction components are added to the magnesium.

In order to improve the reaction between disiloxane and arylene halide and magnesium it is expedient to use solvents which are inert toward these materials at the same time. The inert solvents which are commonly used for the reaction of metals with organohalogen compounds can be used for this, especially ether, e.g. diethylether, di-n-butylether and tetrahydrofuran, as well as toluene and xylene. Mixtures of solvents can also be used.

The reaction of disiloxane with arylene halides and magnesium is preferably carried out at 15° to 150° C. and normal pressure. If desired, higher or lower pressures can be used. The reaction of disiloxane with arylene halide and magnesium is best carried out in an atmosphere which is inert toward these materials, i.e., one from which the water vapor and oxygen contained in the air are excluded.

The isolation of the products obtained from the reaction of the chlorine-containing disiloxanes with arylene halides and magnesium can take place in the same manner, as is common for the isolation of products obtained or desired from organometallic syntheses, especially Grignard syntheses. Preferably the reaction mixtures which are obtained from the reaction of the disiloxanes with arylene halides and magnesium are mixed with water at 0 to 20° C. The pH value of the mixture is kept under 7, if necessary, by the addition of an acid, such as hydrochloric acid. During this water treatment the Si-bonded chlorine atoms which are present are converted to hydroxyl groups by hydrolysis.

Suitable polysilarylenesiloxanes for use herein and composed of recurring sequences of the general formula —(SiR'$_2$O)$_{n'}$SiR'$_2$R— wherein n' is a whole number greater than 1 (i.e. materials as defined in Formula I where n is greater than 1 and p is 0), are those which have been prepared as described above, by the reaction of diorganosiloxanes with arylene halides and magnesium, with the exception that in this reaction the diorganosiloxane used are not disiloxanes of the general formula

but diorganopolysiloxanes of the general formula

wherein n' is a whole number greater than 1.

Operable polysilarylenesiloxanes for use herein wherein, referring to Formula I, n is at least 1, preferably 1 to 500, especially 1, and p is at least 1, are prepared in the manner described above, by reacting diorganodisiloxanes or diorganopolysiloxanes containing Si-bonded chlorine atoms with arylene halides and magnesium, with the exception that in this reaction additional diorganodichlorosilanes are also used. The preparation of polysilarylenesiloxanes by reacting diorganosiloxanes or diorganopolysiloxanes containing Si-bonded chlorine atoms with arylene halides, diorganodichlorosilanes and magnesium is disclosed and claimed in the aforesaid patent application entitled "Method of Preparing Polysilarylenesiloxanes," filed concurrently herewith.

Preferably at least 3 mols of alkali hydroxide are incorporated per equivalent of Si—O—Si— group in the polysilarylenesiloxane to be split or opened. There is no decisive upper limit for the amount of the alkali hydroxide to be incorporated.

Lithium-, sodium-, potassium-, rubidium-, and cesium-hydroxide can be used as the alkali hydroxide. Mixtures of these alkali hydroxides can also be used. Preferably sodium hydroxide is used as the alkali hydroxide.

The alkali hydroxides are preferably incorporated in the form of 8 to 14 normal-solutions in water and/or lower monohydric alcohols such as methanol or ethanol.

The order of addition of the reactants for the reaction of the polysilarylenesiloxanes with alkali hydroxide is not critical but it is preferred to add the polysilarylenesiloxanes to the alkali hydroxide. In order to make the reaction easier, the polysilarylenesiloxanes should be present in such a form that thorough mixing with the alkali hydroxide is possible. If the polysilarylenesiloxanes used according to the present discovery are fluid at room temperature, or soluble in organic solvents such as hydrocarbon solvents, e.g. toluene and/or xylene, alcohols such as methanol or ethanol, or ethers such as di-n-butylether, to at least one part of polysilarylenesiloxane in 30 parts solvent at 100° C. or if the polysilarylenesiloxanes melt below their decomposition temperature, they are incorporated in the form of their solutions or in the form of melts. If the polysilarylenesiloxanes are not soluble to the extent of at least one part of polysilarylenesiloxane in 30 parts organic solvent or do not melt below their decomposition temperature, they are incorporated in the form of powders obtained by mechanical comminution. The reaction of polysilarylenesiloxane with alkali hydroxide is preferably carried out at 15° to 50° C. and normal pressure. It continues for 3 to 130 hours, depending upon whether the applied temperature is at the upper or at the lower part of the temperature range given and upon the amount of Si-bonded hydroxyl groups which is desired in the ultimate product.

The reaction mixtures obtained from the reaction of polysilarylenesiloxane and alkali hydroxide are primarily viscous fluids. They can be further reacted with the acid without isolating any components, in order to free the silarylenesilanols and/or polysilarylenesiloxanols from their salts. Any acids having a dissociation constant in aqueous 0.1 normal solution at 25° C. of at least $4 \times 10^{-7}$ can be employed herein. Examples of such acids are inorganic acids, such as hydrochloric acid, sulfuric acid, phosphoric acid and carbonic acid, and organic acids, such as acetic acid. Preferably hydrochloric acid is used. The acids are preferably used in the form of their aqueous 0.1 to 5 normal-solutions. In order that all SiO alkali groups will be converted to Si-bonded hydroxyl groups, the acid must be incorporated in amounts which are equivalent to the amount of the alkali hydroxide which was incorporated in the previous stage. It is expedient to employ the acid in amounts ranging from 1.0 to 1.5 mols of acid in reaction (2) per mol of alkali metal hydroxide employed in reaction (1), in order to avoid splitting the silarylene groups.

The order of addition of the reactants for the reaction of the alkali-silarylenesilanolates and/or polysilarylenesiloxanolates with acid is not critical but it is preferred to add the reaction mixtures obtained from the reaction of polysilarylenesiloxane with alkali hydroxide to the acid. The reaction of the alkali-silarylenesilanolates and/or polysilarylenesiloxanolates with acid is preferably carried out at 0–50° C., especially at room temperature and normal pressure.

The mixtures of the reaction components are expediently thoroughly shaken or stirred during the reaction of the silarylene compounds with alkali hydroxide as well as during the reaction of the products obtained thereby with acid, in order to achieve good dispersion of the reaction components with each other.

The silarylene silanols and/or polysilarylene siloxanols obtained according to the present discovery are generally finely divided solids or wax-like soft masses. They can, for example, be co-condensed in the known manner with the diorganopolysiloxanes, e.g. dimethylpolysiloxanes having a viscosity of 100–10.10⁶ cs./25° C. which are commonly used for preparing organopolysiloxane elastomers or with organopolysiloxanes commonly used for the preparation of organopolysiloxane resins, especially with those having units of the formula $R'_rSiO_{4-r/2}$ wherein $r$ has an average value of 0.9–1.8. The copolymers thus obtained can be processed further in the known manner to organopolysiloxane elastomers or organopolysiloxane resin molds and coatings. By common equilibration, polydiorganosiloxane blocks can be incorporated in the silarylenesilanols and polysilarylenesiloxanols of polysilarylenesiloxane composed of sequences of Formula I when $p$ is at least 1, or the polydiorganosiloxane blocks which are already present can be lengthened without splitting the polysilarylene blocks.

The measures described in the following examples are always carried out at room temperature, i.e. at about 20° C. or without external application of heat, and under normal pressure, i.e. at about 760 mm. Hg abs., insofar as not otherwise described. These examples are included herein to aid those skilled in the art to gain a full understanding of this invention. The scope of the invention is delineated in the claims and is not limited by these examples.

*Example 1*

(a) 6.5 g. p-dibromobenzene was added under nitrogen to 55.0 g. magnesium chips in 100 ml. of water-free tetrahydrofuran in a 2 liter flask equipped with stirrer, reflux cooler, dropping funnel, thermometer and gas inlet tube, in order to activate the magnesium. After the reaction between the magnesium and the dibromobenzene had gotten underway, as indicated by an increase in temperature of the reaction mass, a mixture of 700 ml. water-free tetrahydrofuran, 253 g. p-dibromobenzene and 223.5 g. sym-tetramethyldichlorodisiloxane was added to the reaction mass through a dropping funnel over a period of 3 hours. After about 4 hours, the magnesium was fully used up and the temperature of the reaction mixture had descended to room temperature.

600 ml. water, mixed with 2 ml. concentrated hydrochloric acid was poured into the reaction mixture thus obtained. Two clear, fluid phases formed. The lower, aqueous layer was discarded; the upper, organic layer was neutralized with solid sodium bicarbonate. After filtering and distilling off the solvent at 60° to 70° C., 222 g. (97 percent of the theoretical) of a readily ethanol soluble wax-like compound was obtained. Based on its synthesis, the values found during the elementary analysis (57.58 wt. percent C, 7.72 wt. percent H and 26.98 wt. percent Si), and the fact that no hydrogen is formed when the substance was treated with alkali, this compound was composed of sequences of the formula

It contained no Si-bonded hydroxyl groups and an average of more than 10 sequences of the above formula per molecule.

(b) 208.4 g. of this polysilarylenesiloxane was melted by heating to 80 to 100° C. This melt was dispersed in a solution of 150 g. sodium hydroxide in 160 ml. water by means of a high speed gyratory mixer as described, for instance, by Willems in Dechemamonographien, vol. XIX, pp. 72–79. The emulsion thus obtained was kept in motion for 14 hours on a shaker and then poured into 1500 ml. aqueous hydrochloric acid, containing a total of 146 ml. hydrogen chloride, while stirring with the above gyratory mixer. The material coming to the surface of the mixture was grease-like at high temperature and wax-like at low temperature and was taken up in diethylether. The solution thus obtained was neutralized with solid sodium bicarbonate and then washed four times with water, 250 ml. each. After drying the solution with sodium sulfate, distilling off the ether at 30–40° C. and drying the residue in a vacuum dessicator over phosphorus pentoxide until constant weight, there was obtained 210 g. of a colorless, wax-like substance containing 5.7 percent by weight hydroxyl groups and having a molecular weight of about 580 to 600. These two values indicate a compound of the formula $$H[OSi(CH_3)_2C_6H_4Si(CH_3)_2]_{z'}OH$$

wherein $z'$ has an average value of 2.8.

*Example 2*

Example 1 was repeated with the exception that the emulsion obtained from polysilarylenesiloxane and sodium hydroxide solution was not agitated for 14 hours on a shaker, but was stirred while heating to 40 to 45° C. for 7 hours by means of a blade stirrer with 2000 r.p.m. 212 g. of a colorless, wax-like substance was obtained containing 11.6 percent by weight of Si-bonded hydroxyl groups and having a molecular weight of 260 to 280. These two values indicate that the product was of the formula  wherein $z''$ has an average value of 1.3.

Example 3

8 g. of p-dibromobenzene was added under nitrogen to 150 g. of magnesium chips in 300 ml. of water-free tetrahydrofuran in a 4 liter flask equipped with stirrer, reflux cooler, dropping funnel, thermometer and gas inlet tube in order to activate the magnesium. After the reaction between the magnesium and the dibromobenzene has gotten underway, as indicated by an increase in temperature in the reaction mass, a mixture of 600 ml. water-free tetrahydrofuran, 720 g. p-dibromobenzene, 70 g. sym-tetramethyldichlorodisiloxane and 354 g. dimethyldichlorosilane was added to the reaction mass from a dropping funnel over a period of three hours. After about four hours the magnesium was fully used up and the temperature of the reaction mass had descended to room temperature.

1200 ml. water mixed with 4 ml. of concentrated hydrochloric acid was poured into the reaction mixture thus obtained. Two clear, fluid phases were formed. The lower, aqueous layer was discarded and the upper, organic layer was neutralized with solid sodium bicarbonate. After filtering and distilling off the solvent at 60–70° C., 396 g. (94.1% of the theoretical) of a colorless, powdery substance was obtained. On the basis of its synthesis and on the basis of the fact that in treating this substance with alkali no hydrogen was formed, it was composed of sequences of the formula

wherein $p'$ has an average value of 8. This compound contained no Si-bonded hydroxyl groups.

280 g. of this polysilarylenesiloxane mixed with 120 ml. ethanol were dispersed in a solution of 120 g. sodium hydroxide in 120 ml. water in the gyratory mixer described in Example 1(b). The emulsion thus obtained was agitated for 24 hours on a shaker and then poured into 2000 ml. of hydrochloric acid-containing water, containing a total of 150 ml. hydrogen chloride, while stirring with the above gyratory mixer. Further processing of the product which separated out at the surface of the mixture was accomplished in the same manner as the isolation of the product of Example 1(b). 278 g. of a powdery substance was obtained. The product contained 1.2 percent by weight of Si-bonded hydroxyl groups. A compound of the formula $$H\{OSi(CH_3)_2[C_6H_4Si(CH_3)_2]_{p''}\}_{z'''}OH$$

was therefore present wherein $p''$ has an average value of 9 and $z'''$ had an average value of 1.99.

Example 4

The method of Example 3 was repeated with the exception that the emulsion obtained from polysilarylenesiloxane and sodium hydroxide was not agitated for 24 hours on a shaker but was stirred while heating to 40–45° C. for 8 hours with a blade stirrer at 2000 r.p.m.

282 g. of a colorless, powdery substance was obtained. The product contained 2.2 percent by weight of Si-bonded hydroxyl groups. A compound of the formula $$H\{OSi(CH_3)_2[C_6H_4Si(CH_3)_2]_{p''}\}_{z''''}OH$$

was therefore present in which $z''''$ had an average value of 1.07.

As may be seen from the average values of $z'$, $z''$, $z'''$ and $z''''$, mixtures of silarylenesilanols and polysilarylenesiloxanols are obtained according to Examples 1 to 4.

Example 5

100 g. of a polysilarylenesiloxane prepared as described in Example 1(a) was melted by heating to about 80–100° C. The melt thus obtained was added to a solution of 50 g. sodium hydroxide in 50 ml. water and 10 ml. ethanol while stirring with a blade stirrer at 2000 r.p.m. The stirring was continued for 24 hours, heating to 30–35° C. The emulsion thus obtained was poured into 2000 ml. hydrochloric acid-containing water at 0° C., containing a total of 46 g. hydrogen chloride while stirring with the gyratory mixer of Example 1(b). The solid material which separated out was filtered off, washed four times with 100 ml. water each time on a slide and dried in the vacuum dessicator over phosphorus pentoxide. 106 g. (97 percent of the theoretical) of a colorless crystalline, flaked substance was obtained. A sample of the substance crystallized with ethanol had a melting point of 137.5–138° C. The molecular weight determination gave a value of 225–230; hydroxyl group determination yielded a value of 14.9–15.0 percent by weight. A compound of the formula $HOSi(CH_3)_2C_6H_4Si(CH_3)_2OH$ was indicated.

Example 6

Equivalent results were obtained when Example 1 was repeated employing lithium hydroxide, potassium hydroxide, rubidium hydroxide or cesium hydroxide in place of the sodium hydroxide.

Example 7

Equivalent results were obtained when Example 3 was repeated employing sulfuric acid, phosphoric acid, carbonic acid or acetic acid in place of the hydrochloric acid employed.

Example 8

Equivalent results were achieved when Example 1 was repeated employing

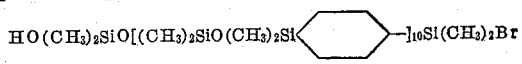

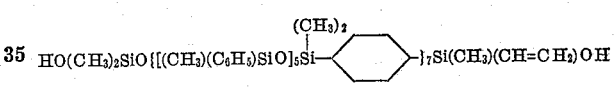

or 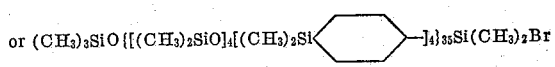

Example 9

Equivalent results are achieved when the Example 1(b) is repeated employing in place of the polysilarylenesiloxane of repeating

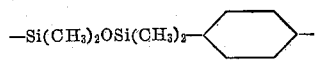

units any of the following:

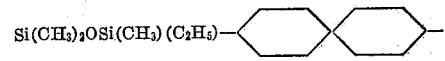

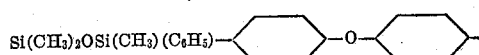

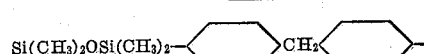

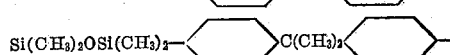

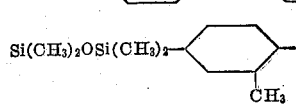

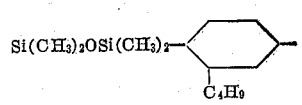

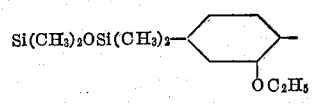

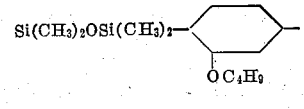

That which is claimed is:

1. The method for preparing silarylenesilanols or polysilarylenesiloxanols comprising
   (1) reacting a polysilarylenesiloxane wherein the arylene radicals are para isomers with at least one mol of alkali metal hydroxide per mol of polysilarylenesiloxane, the alkali metal hydroxide being employed as an 8 to 14 normal-solution in a medium selected from the group consisting of water, lower monohydric alcohols, and mixtures thereof, the reaction being carried out by adding the polysilarylene siloxane to the alkali metal hydroxide and at a temperature in the range of about 15° to 50° C. for a period of from about 3 to 130 hours, and
   (2) thereafter reacting the product from (1) with an acid having a dissociation constant of at least $4 \times 10^{-7}$ when measured in an aqueous 0.1 normal solution at 25° C., the reaction (2) being carried forward at a temperature in the range of about 0° to 50° C. and employing acid in amount at least equivalent to the amount of alkali metal hydroxide employed in reaction (1).

2. The method of claim 1 further characterized in that the polysilarylenesiloxane employed is a polymer of average unit formula $-(R'_2SiO)_nSiR'_2(RSiR'_2)_pR-$ where each R is a divalent para-arylene radical, R' is a monovalent hydrocarbon radical, $n$ is an integer and $p$ is 0 or an integer.

3. The method of claim 1 further characterized in that the polysilarylenesiloxane was prepared by reacting a disiloxane of the formula $ClR'_2SiOSiR'_2Cl$ with an arylene halide of the formula XRX and magnesium, where each R' is a monovalent hydrocarbon radical, R is a para-arylene radical and X is bromine or chlorine, said reaction being carried forward at a temperature in the range from about 15° to 150° C. in the absence of oyxgen and water vapor and in the presence of an organic solvent which is inert toward the reactants.

4. The method of claim 2 further characterized in that each R' is a monovalent radical selected from the group consisting of $-CH_3$, $-C_6H_5$ and $-CH=CH_2$, each R is

$n$ is 1–500 and $p$ is 0–30.

5. The method of claim 1 further characterized in that the polysilarylenesiloxane employed is a polymer of average unit formula $-(R'_2SiO)_{n'}SiR'_2R-$ where $n'$ is an integer greater than 1, R' is a monovalent hydrocarbon radical and R is a para-arylene radical.

6. The method of claim 5 further characterized in that R' is a monovalent radical selected from the group consisting of $CH_3$, $-C_6H_5$ and $-CH=CH_2$, $n'$ is 2–500 and R is para-phenylene.

References Cited

UNITED STATES PATENTS 2,202,634   8/1965   Merker _____ 260—46.5
3,209,018   9/1965   Merker _____ 260—46.5

DONALD E. CZAJA, *Primary Examiner.*

LEON J. BERCOVITZ, *Examiner.*

M. I. MARQUIS, *Assistant Examiner.*